(12) United States Patent
Miyazaki

(10) Patent No.: US 7,055,382 B2
(45) Date of Patent: *Jun. 6, 2006

(54) WHEEL-ACTING FORCE MEASURING DEVICE

(75) Inventor: Nagao Miyazaki, Tondabayashi (JP)

(73) Assignee: Japan Electronics Industry Co., Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/897,930

(22) Filed: Jul. 23, 2004

(65) Prior Publication Data

US 2004/0255659 A1    Dec. 23, 2004

Related U.S. Application Data

(63) Continuation of application No. 10/038,385, filed on Jan. 3, 2002, now Pat. No. 6,772,624, which is a continuation of application No. 09/472,106, filed on Dec. 27, 1999, now Pat. No. 6,345,530, which is a continuation of application No. 08/934,114, filed on Sep. 19, 1997, now Pat. No. 6,006,597, which is a continuation of application No. 08/710,268, filed on Sep. 24, 1996, now abandoned, which is a continuation of application No. 08/195,421, filed on Feb. 14, 1994, now abandoned.

(30) Foreign Application Priority Data

Feb. 15, 1993  (JP)  ........................... 5-65892

(51) Int. Cl.
*E01C 23/00* (2006.01)

(52) U.S. Cl. ................................................. 73/146

(58) Field of Classification Search ............... 73/118.1, 73/763, 768, 769, 770, 862.041, 862.042, 73/862.043, 146, 862.625, 862.627
See application file for complete search history.

(56) References Cited

U.S. PATENT DOCUMENTS

| 3,350,926 A | | 11/1967 | Webb |
| 3,620,074 A | | 11/1971 | Laimins et al. |
| 3,867,838 A | | 2/1975 | Gerresheim |
| 4,576,053 A | * | 3/1986 | Hatamura ............... 73/862.629 |
| 4,748,844 A | | 6/1988 | Yoshikawa et al. |
| 4,913,457 A | * | 4/1990 | Hafner et al. ............ 280/5.514 |
| 4,936,149 A | | 6/1990 | Jacobson |
| 5,160,055 A | * | 11/1992 | Gray .......................... 212/278 |
| 5,167,385 A | * | 12/1992 | Hafner ..................... 244/76 R |

(Continued)

FOREIGN PATENT DOCUMENTS

EP        363570        4/1990

(Continued)

OTHER PUBLICATIONS

N. Miyazaki et al.,"Antilock Brake System (M-ABS) Based on the Friction Coefficient Between the Wheel and the Toad Surface" SAE Technical Paper Series, International Congree and Exposition, Detroit, Michigan. Feb. 26, 1990.

*Primary Examiner*—Max Noori
(74) *Attorney, Agent, or Firm*—Jordan and Hamburg LLP

(57) ABSTRACT

The invention provides a wheel-acting force measuring device free from the influences of cross talk due to brake torque (torsional torque).

A hole is formed in or adjacent an axle of a vehicle at a brake caliper angle or an angle close thereto, and a stress detecting sensor is embedded at a position in the hole which coincides with the stress center axis of or adjacent the axle.

14 Claims, 19 Drawing Sheets

U.S. PATENT DOCUMENTS

| | | |
|---|---|---|
| 5,186,042 A | 2/1993 | Miyazaki |
| 5,507,187 A | 4/1996 | Miyazaki |
| 5,569,857 A | 10/1996 | Miyazaki |
| 6,006,597 A | 12/1999 | Miyazaki |
| 6,032,520 A | 3/2000 | Miyazaki |
| 6,345,530 B1 * | 2/2002 | Miyazaki ................ 73/118.1 |
| 6,772,624 B1 * | 8/2004 | Miyazaki ................ 73/118.1 |
| 6,832,512 B1 * | 12/2004 | Miyazaki ................ 73/146 |

FOREIGN PATENT DOCUMENTS

| | | |
|---|---|---|
| EP | 504731 | 9/1992 |
| JP | 4331336 | 11/1992 |

* cited by examiner

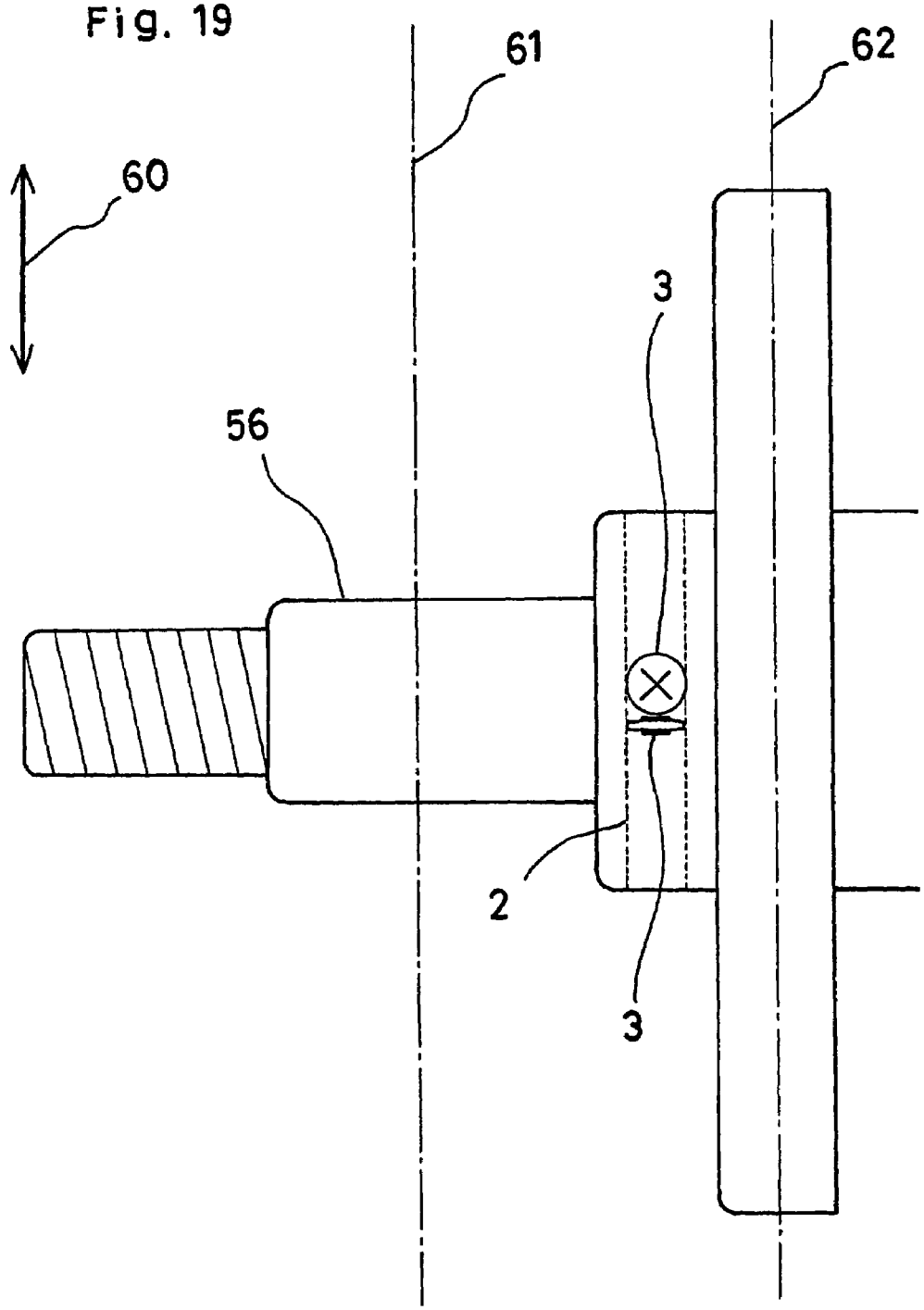

US 7,055,382 B2

WHEEL-ACTING FORCE MEASURING DEVICE

REFERENCE TO RELATED APPLICATION

This is a Continuation of application Ser. No. 10/038,385 filed Jan. 3, 2002, now U.S. Pat. No. 6,772,624, which is a Continuation of Ser. No. 09/472,106 filed Dec. 27, 1999, now U.S. Pat. No. 6,345,530, which is a Continuation of Ser. No. 08/934,114 filed Sep. 19, 1997, now U.S. Pat. No. 6,006,597, which is a Continuation of Ser. No. 08/710,268 filed Sep. 24, 1996, now Abandoned, which is a Continuation of Ser. No. 08/195,421 filed Feb. 14, 1994, now Abandoned.

BACKGROUND OF THE INVENTION

The present invention relates to a wheel-acting force measuring device for detecting a road surface friction force, a normal counterforce and a road surface friction coefficient, which can be used as a component of either an antilock brake system (ABS) for preventing the locking of wheels on application of the hard brake to a vehicle or a traction control system for preventing excessive slippage of wheels during acceleration.

As for such wheel-acting force measuring device for detecting a load surface friction force, a normal counterforce and a road surface friction coefficient, which, can be used as a component of either an antilock brake system for vehicles or a traction control system, various types have heretofore been developed and proposed. However, such known devices require a relative-to-ground velocity sensor or a vehicle deceleration sensor to accurately find the vehicle velocity, making the device complicated and presenting a problem of accuracy. Thus, there has been a need for a device for directly measuring dynamic quantities concerning actions between the road surface and the wheels.

To meet this need, the present applicant proposed, in Japanese Patent Application No. Hei 3-130840, a wheel-acting force measuring device comprising a hole formed in or adjacent an axle, a stress sensor having a strain gauge attached thereto, said stress sensor being fixedly embedded in said hole with its strain gauge oriented in a suitable direction according to an intended stress or load, so that it is capable of directly measuring an optional stress or load occurring in or adjacent the axle.

However, there is a problem that detection signals delivered from the stress detecting sensor are influenced by cross talk according to the selected position of the hole since there are produced in or adjacent the axle a complicated shearing strain accompanying a bending deformation caused by a road surface friction force, a vertical stress and a side force acting on the wheel and a shearing strain accompanying a torsional deformation caused by the brake torque during application of the brake.

SUMMARY OF THE INVENTION

In view of such problem, the present Invention has for its object the provision of a wheel-acting force measuring device comprising a stress detecting sensor disposed at a stress center axis or stress center point (neutral spot) around the axle acted on by wheel-acting forces from a road surface, so that it is not influenced by cross talk other than road surface friction forces or normal counterforces, and more particularly a wheel-acting force measuring device comprising a hole in or adjacent an axle at a brake caliper angle or an angle close thereto, a stress detecting sensor fixedly embedded in said hole, so that it is not influenced by cross talk, and a wheel-acting force measuring device comprising a hole at a neutral spot free from cross talk, so that the device is not influenced by cross talk.

The present invention described in claim 1 is a wheel-acting force measuring device comprising a hole in or adjacent an axle at a brake caliper angle or an angle close thereto, and a stress detecting sensor fixedly embedded at the position in said hole which coincides with the stress center axis of or adjacent the axle.

In the invention described in claim 1, since a hole is formed in or adjacent an axle at a brake caliper angle or an angle close thereto and a stress detecting sensor is fixedly embedded at the position in said hole which coincides with the stress center axis of or adjacent the axle, the cross talk to the output signal from the stress detecting sensor due to the brake torque can be effectively excluded.

The present invention described in claim 2 in a wheel-acting force measuring device comprising a plurality of holes formed in or adjacent an axle at a brake caliper angle or an angle close thereto, stress detecting sensors fixedly embedded at the positions in said holes which coincide with the stress center axes of or adjacent the axle, wherein the detection signal from each said stress detecting sensor is processed In a signal processing circuit to derive a specified stress.

In the present invention described in claim 2, a plurality of holes are formed in or adjacent an axle at a brake caliper angle or an angle close thereto and stress detecting sensors are fixedly embedded at the positions in said holes which coincide with the stress center axes of or adjacent the axle, wherein the detection signal from each said stress detecting sensor is processed in a signal processing circuit, thereby making it possible to measure a specific acting force among wheel-acting forces such as a road surface friction force, a normal counterforce and a road surface friction coefficient without being Influenced by cross talk doe to brake-torque.

The present invention described in claim 3 is a wheel-acting force measuring device comprising a stress detecting sensor fixedly embedded in a spindle or an axle at a position between the brake disk attaching position of a vehicle and the road-contacting surface of a wheel.

In the present invention described in claim 3, a stress detecting sensor is fixedly embedded in a spindle or an axle at a position between the brake disk attaching position of a vehicle and the road-contacting surface of a wheel, there occurs less torsional deformation due to brake torque during application of the brake and it is possible to measure outputs such as a road surface friction force and a normal counterforce having almost no cross talk due to brake torque.

The present invention described in claim 4 is a wheel-acting force measuring device comprising a stress detecting sensor fixedly embedded in a spindle or an axle at a position between the brake disk attaching position of a vehicle and the road-contacting surface of a wheel at a brake caliper angle or an angle close thereto.

In the present invention described in claim 4, since a sensor is attached at the position described in claim 3 at a brake caliper angle or an angle close thereto, there is no torsional deformation due to brake torque during application of the brake and it is possible to measure outputs such as a road surface friction and a normal counterforce having no cross talk due to brake torque.

The present invention described in claim 5 is a wheel-acting force measuring device as set forth in any one of claims 1 through 4, comprising a stress detecting sensor and a signal processing circuit which are simultaneously fixedly embedded in a hole formed in or adjacent an axle at a brake caliper angle or an angle close thereto.

In the present invention described in claim 5, in a wheel-acting force measuring device as set forth in any one of claims 1 through 4, since a stress detecting sensor and a signal processing circuit are simultaneously fixedly embedded in a hole formed in or adjacent an axle at a brake caliper angle or an angle close thereto, there is obtained a high ratio of signal to noise for the output signal from the signal processing circuit.

The present invention described in claim 6 is a wheel-acting force measuring device comprising a stress detecting sensor disposed in or adjacent an axle of a vehicle or around an axle subjected to axle-acting forces and on a stress center axis capable of excluding cross talk other than load surface friction forces or normal counterforces or a stress center axis capable of minimizing the amount of cross talk.

In the present invention described in claim 6, since a stress detecting sensor is disposed in or adjacent an axle of a vehicle or around an axle subjected to axle-acting forces and on a stress center axis capable of excluding cross talk other than load surface friction forces or normal counter-forces or a stress center axis capable of minimizing the amount of cross talk, it is possible to measure outputs such as a road surface friction force and a normal counterforce with cross talk other than the road surface friction force and normal counterforce.

The present Invention described in claim 7 is a wheel-acting force measuring device is set forth in any one of claims 1 through 6, wherein the strain gauge of the stress detecting sensor is disposed at an angle of approximately 45 degrees with respect to the horizontal and vertical stress center axes of or adjacent the axle.

In the present invention described in claim 7, in a wheel-acting force measuring device as set forth in any one of claims 1 through 6, the strain gauge of the stress detecting sensor 18 disposed at an angle of approximate 45 degrees with respect to the horizontal and vertical stress center axes of or adjacent the axle and Is fixedly embedded in a hole formed in or adjacent an axle at a brake caliper angle or an angle close thereto. It is possible for the stress detecting sensor to measure a road surface friction force and a normal counterforce acting one a wheel while reducing interference from other wheel-acting forces.

BRIEF DESCRIPTION OF THE DRAWINGS

FIG. 19 is a view showing an example in which stress detecting sensors for two directions (friction force and normal counterforce) are simultaneously embedded.

PREFERRED EMBODIMENTS OF THE INVENTION

Herein described are some embodiments, and the scope of the invention is not limited thereto.

Figure 1:
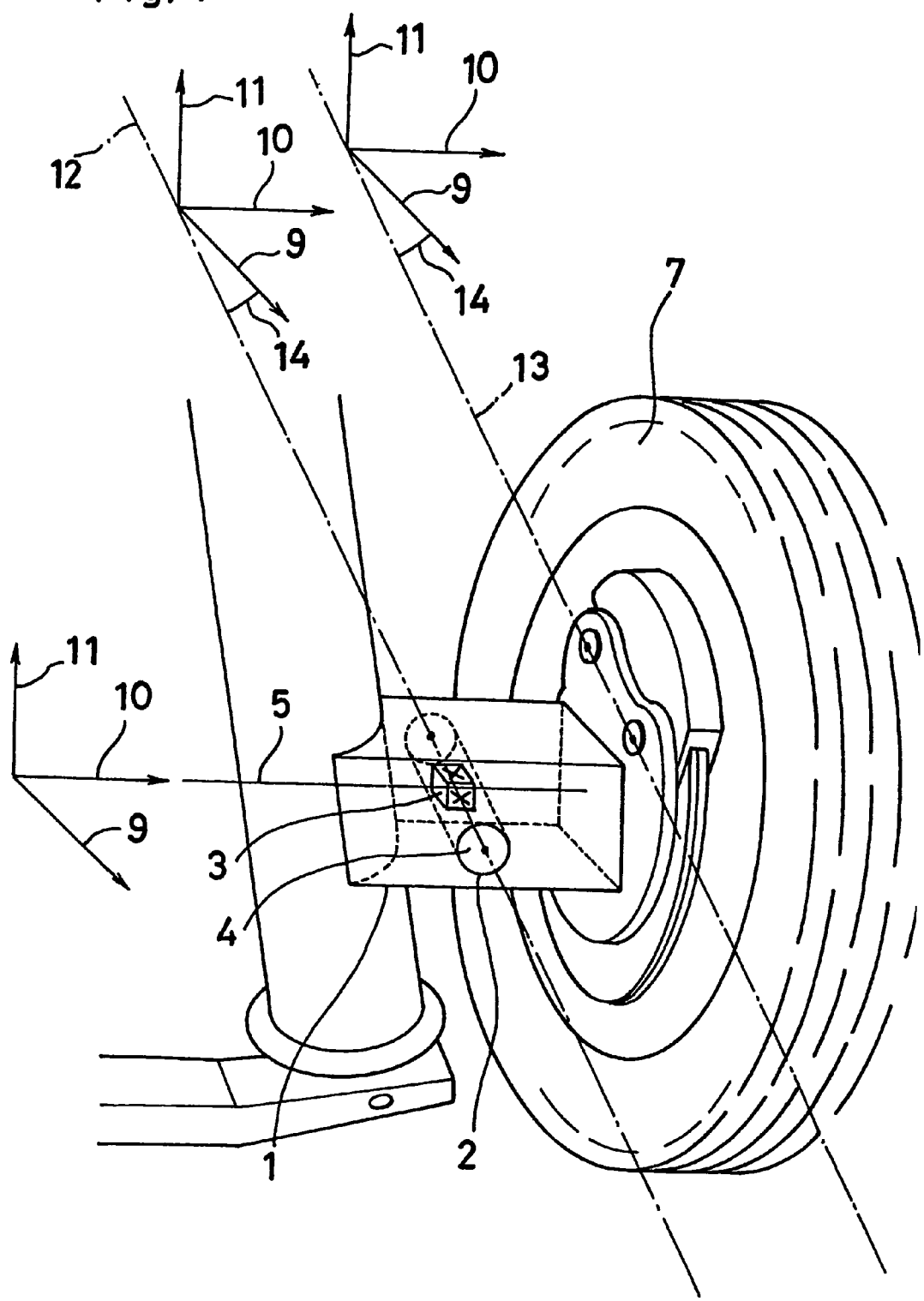
FIG. 1 is a fragmentary perspective view shoving an embodiment of a wheel-acting force measuring device according to the present invention.
Figure 2:
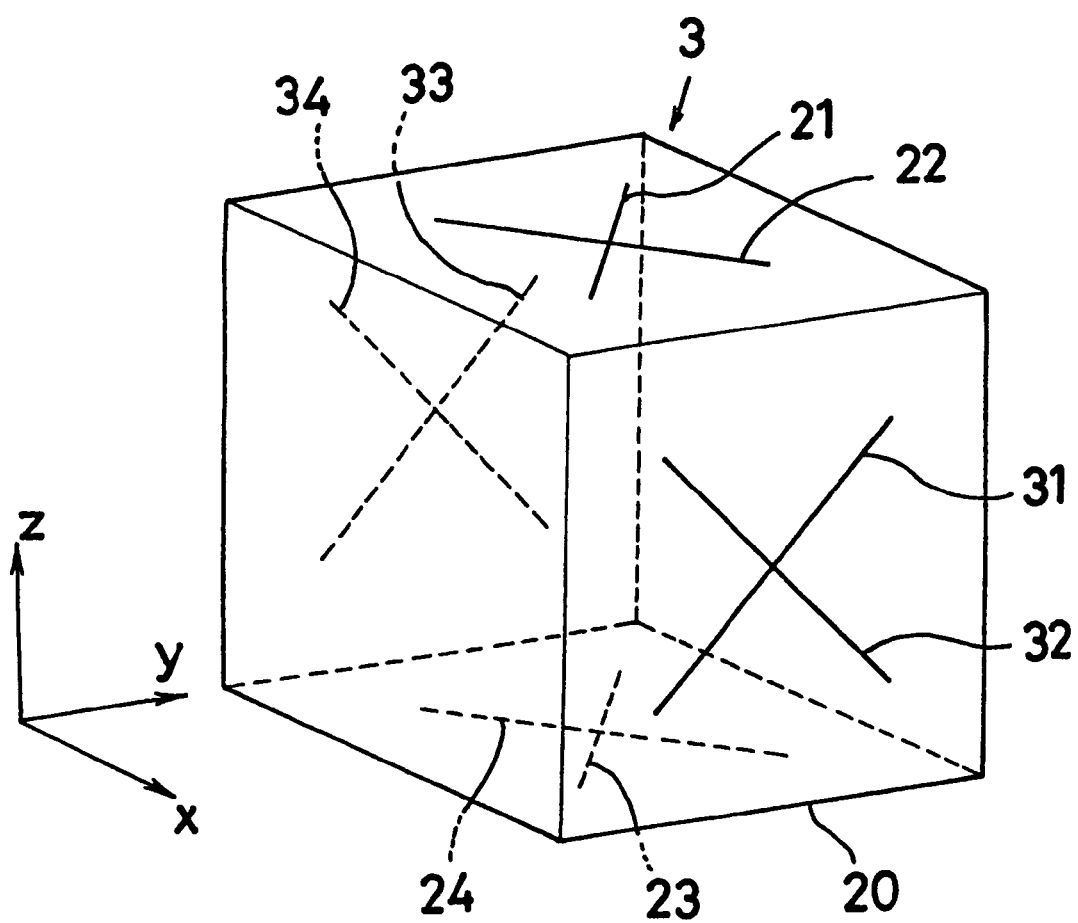
FIG. 2 is a fragmentary perspective view showing an example of the stress detecting sensor of the wheel-acting force measuring device according to the present invention.
Figure 3:
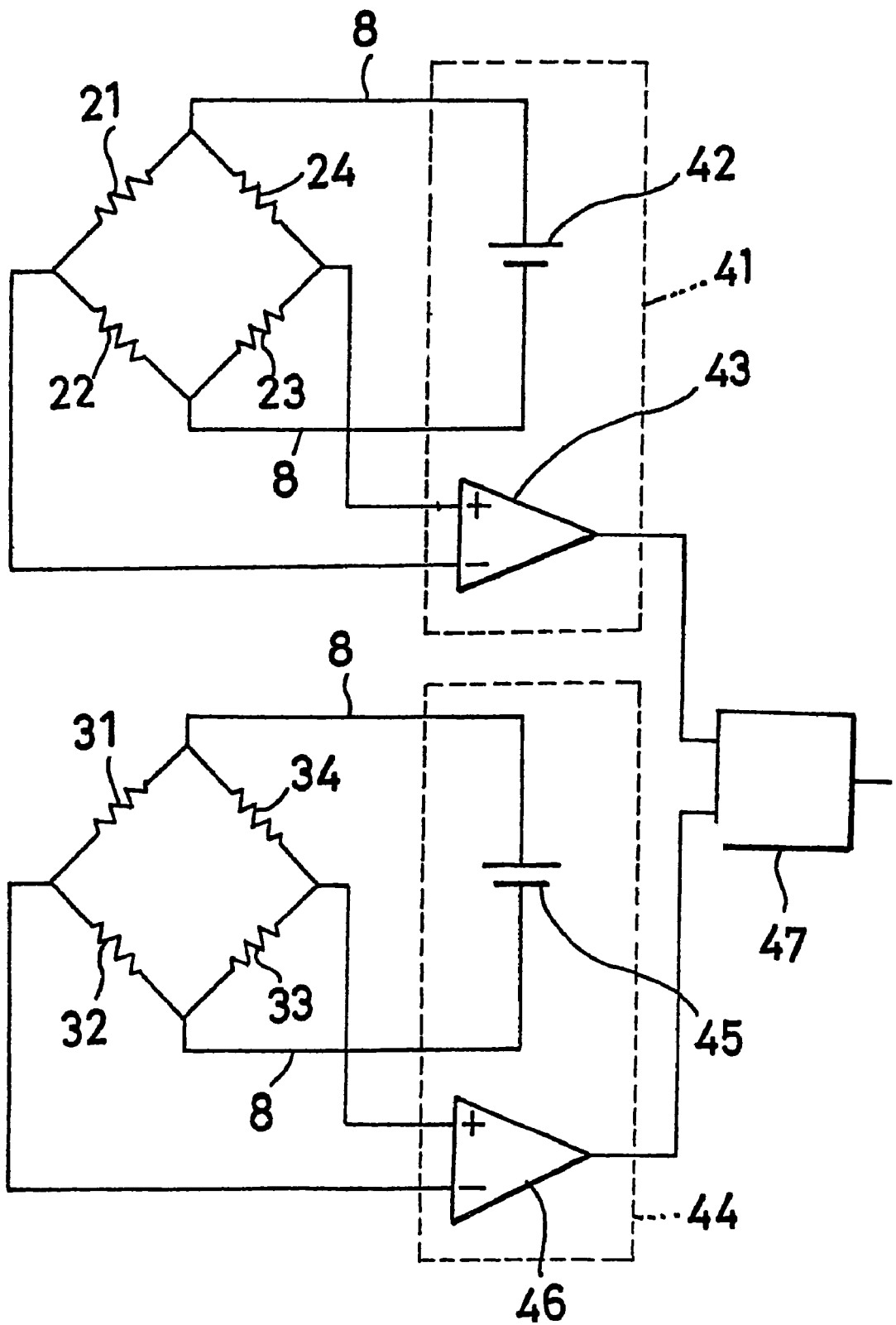
FIG. 3 is a view showing an example of the signal processing circuit of the wheel-acting force measuring device.

An embodiment of a wheel-acting force measuring device for measuring a road surface friction coefficient is shown in FIGS. 1, 2 and 3. FIG. 1 shows how a stress detecting sensor is attached. FIG. 2 shows the stress detecting sensor and FIG. 3 shows a signal processing circuit. As an example, a hole is formed adjacent the axle for the non-driven wheels of an automobile having a suspension construction of the strut type often used in automobiles, at a brake caliper angle or an angle close thereto, and a stress detecting sensor is attached at the position in the hole which coincides with the stress center axis of or adjacent an axle. A hole 2 is formed in a lateral surface of an axle 1 (which, in this example, is a knuckle) with its center axis 12 extending in the direction of travel 9 of a wheel 7 at a brake caliper angle 14 or an angle close thereto and intersecting a center line of the axle (stress center axis) 5. The diameter of the hole 5 may be 5 mm to 10 mm. The center axis (stress center axis) of the axle means the center line of a bending deformation (on which center line there occurs neither tensile strain nor compressive strain due to the bending deformation) produced in the axle 1 by a road surface friction force, a normal counterforce and a side force acting on the wheel rotating around the axis of the spindle, or the center line of a torsional deformation (on which center line there occurs no shearing strain due to the torsional deformation) produced in the axle 1 by the brake torque during application of the brake. These approximately coincide with the center axis of the spindle (the center axis 5 of the axle). A stress detecting sensor 3 is inserted at the position in the hole a which coincides with the stress center axis 5 of or adjacent the axle. The stress detecting sensor 3, as shown in FIG. 2, comprises a base body 20 in the form of a rectangular parallelopiped made of plastic material, such as epoxy resin, or metal or silicone and a strain measuring means attached thereto. As for the strain measuring means, use is made, for example, of metal counterforce wire strain gauges. In the figure, strain gauges 21 through 24 and 31 through 34 are indicated by line segments on the surfaces of the base body 20. The strain gauges 21 through 24 and 31 through 34 are attached to the base body 20 by means adhesively stuck to the surfaces of the base body 20 or by being embedded in the base body 20 adjacent its surfaces. It is preferable to attach the strain gauges 21 through 24 and 31 through 34 such that each forms-an angle of 45 degrees with respect to the y-axis. The stress detecting sensor 3 is inserted in the hole 2 and placed on the center line of the axle (center axis 5 of the axle). Further, the bass body 20 is positioned such that the x-axis, y-axis and axis respectively coincide with the direction of travel 9 of the wheel, the axle direction 10 and the vertical direction 11. It is preferable to position it such that the upper surface of the stress detecting sensor (a surface whose normal line direction is the a direction) is located above the center line of the axle and its lower surface (another surface whose normal line direction is the z-direction) is located below the center line of the axle and such that said tensile strain or compressive strain due to the bending deformation produced by a road surface friction force, a normal counterforce and a side force acting on the wheel has the same value on the opposite surfaces. The greater the distance between the upper and lower surfaces, the greater the the importance of this positioning. Similarly, it is preferable to position it such that the front surface of the stress detecting sensor (a surface whose normal line direction is the x-direction) and its rear surface (another surface whose normal line direction is the x-direction) are located on opposite sides of the stress center line of the axle and such that said strain due to the bending deformation or torsional deformation has the ago value on the opposite surfaces. The hale 2 will be filled with a filler 4 (spacing material) according to the need. The filler 4 sufficiently fills the space around the stress detecting sensor 3 to fix the latter in position. Thereby, the strain gauges 21 through 24 and 31 through 34 are effectively fixedly embedded in the hole 2 at the predetermined positions and in predetermined directions.

FIG. 3 shows a signal processing circuit, wherein the sets of strain gauges 21, 22, 23, 24 and 31, 32, 33, 34 are respectively combined to form bridges which are electrically connected by electric signal wires 8 to an amplifying circuit 41 comprising a dc source 42 and an amplifier 43 and an amplifying circuit 44 comprising a dc source 45 and an amplifier 46. The road surface friction force acting on the wheel produces shearing strains in the upper and lower surfaces of the stress detecting-sensor. The strain gauges 21 through 24 sense this shearing strain. The amplifying circuit 41 delivers a voltage signal which is proportional to said shearing strain, i.e., the road surface friction force.

In addition to the strain gauges 21 through 24 being combined to form a bridge, they are disposed-adjacent the center axis of the axle at a brake caliper angle or an angle close thereto so as to sense said shearing strain; therefore, cross talk to the output signal due to said bending deformation and torsional deformation can be minimized. That is, this arrangement realizes a wheel-acting force measuring device for measuring road surface friction forces with high precision. Likewise, the normal counterforce acting on the wheel produces shearing strains in the front and rear surfaces of the stress detecting sensor. The strain gauges 31 through 34 sense this shearing strain. The amplifying circuit 44 delivers a voltage signal which is proportional to said shearing strain, i.e., the normal counterforce. In addition to the strain gauges 31 through 34 being combined to form a bridge, they are disposed adjacent the center axis of the axle at a brake caliper angle or an angle close thereto so as to sense said shearing strain; therefore, cross talk to the output signal due to said bending deformation and torsional deformation can be minimized. That is, this arrangement realizes a wheel-acting force measuring device for measuring normal counterforces with high precision. By delivering the output signals from the amplifying circuits 41 and 44 to an arithmetic circuit 47, it is possible to measure the road surface friction coefficient. In this case, the arithmetic circuit 47 calculates the quotient of the road surface friction force by the normal counterforce and thereby delivers a signal indicating the road surface friction coefficient.

In the present embodiment, since the space around the stress detecting sensor 3 in the hole 2 is filled with a synthetic resin, such as epoxy resin, or the like, there is a merit that the strain gauges 21 through 24 and 31 through 34 are protected from the outside.

Figure 4:
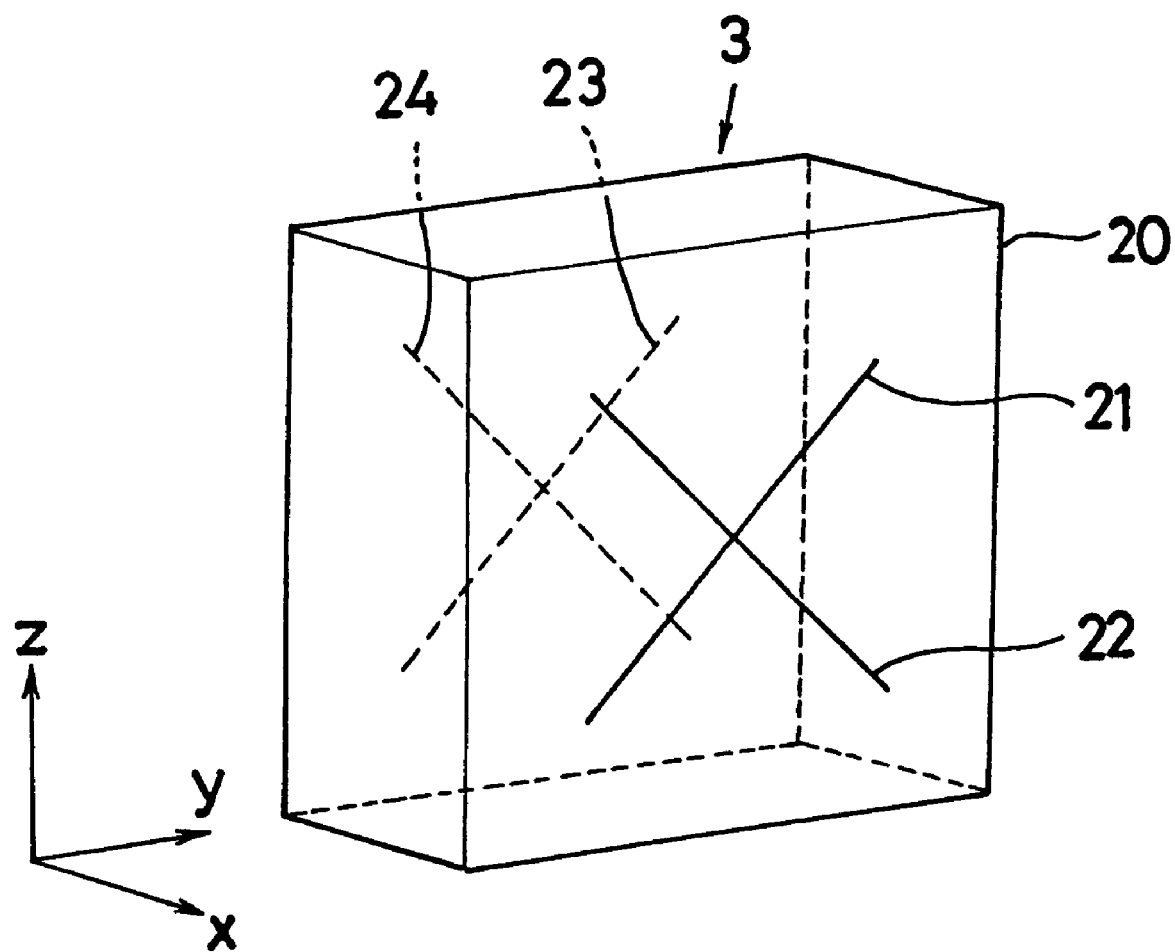
FIG. 4 is a fragmentary perspective view showing another example of the stress detecting sensor of the wheel-acting force measuring device according to the present invention.

To measure either the road surface friction force or the normal counterforce alone, a stress detecting sensor 3 shown in FIG. 4 may be used in place of the stress detecting sensor 3 shown in FIG. 2. It is preferable that the strain gauges 21 through 24 be attached so that each forms an angle of 45 degrees with respect to the y-axis. To measure the road surface friction force, it is preferable that the x-axis, y-axis and z-axis shown in FIG. 4 coincide with the vertical direction 11, the direction of travel 9 of the wheel, and the direction 10 of the axle, respectively. To measure the normal counterforce, it is preferable that the x-axis, y-axis and z-axis shown in FIG. 4 coincide with the direction of travel 9 of the wheel, the direction 10 of the axle, and the vertical direction 11, respectively. The relation between the attaching position and the center line of the axle is the same as in the case of the stress detecting sensor shown in FIG. 2. The strain gauges 21 through 24 are connected to the signal processing circuit shown in FIG. 5. That is they are combined to form a bridge which is connected to the amplifying circuit 41. The amplifying circuit 41 delivers a signal indicating the road surface friction force or the normal counterforce.

Figure 5:
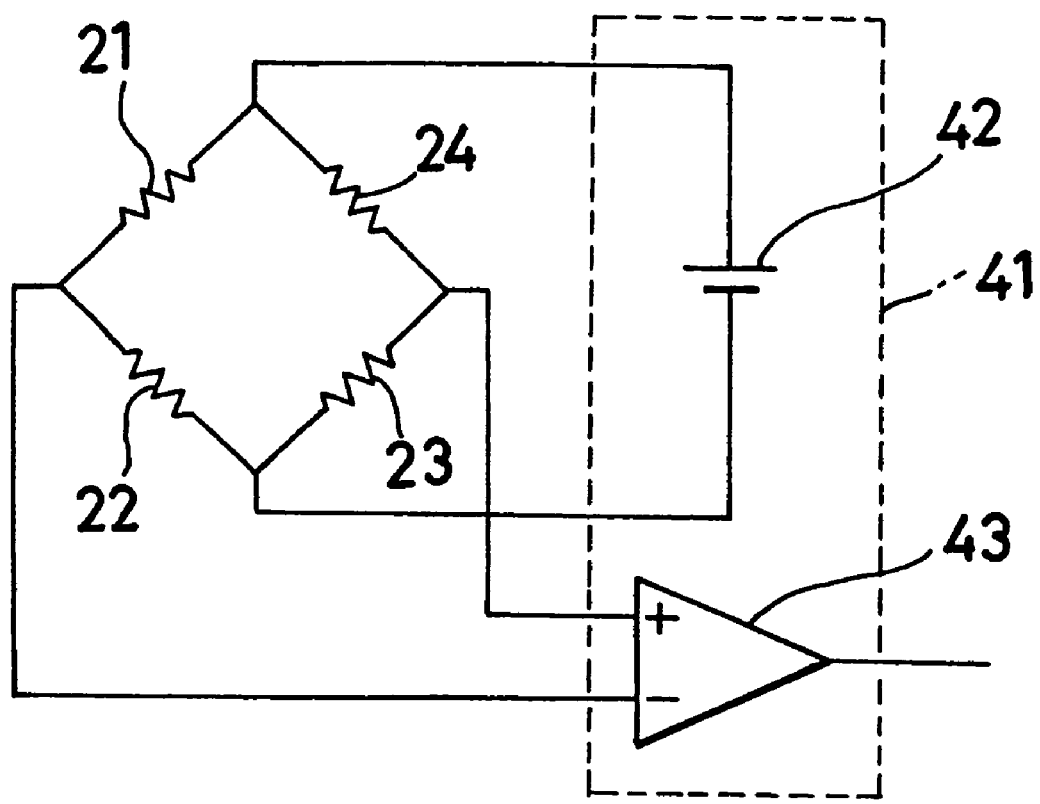
FIG. 5 is a view showing another example of the signal processing circuit of the wheel-acting force measuring device.
Figure 6:
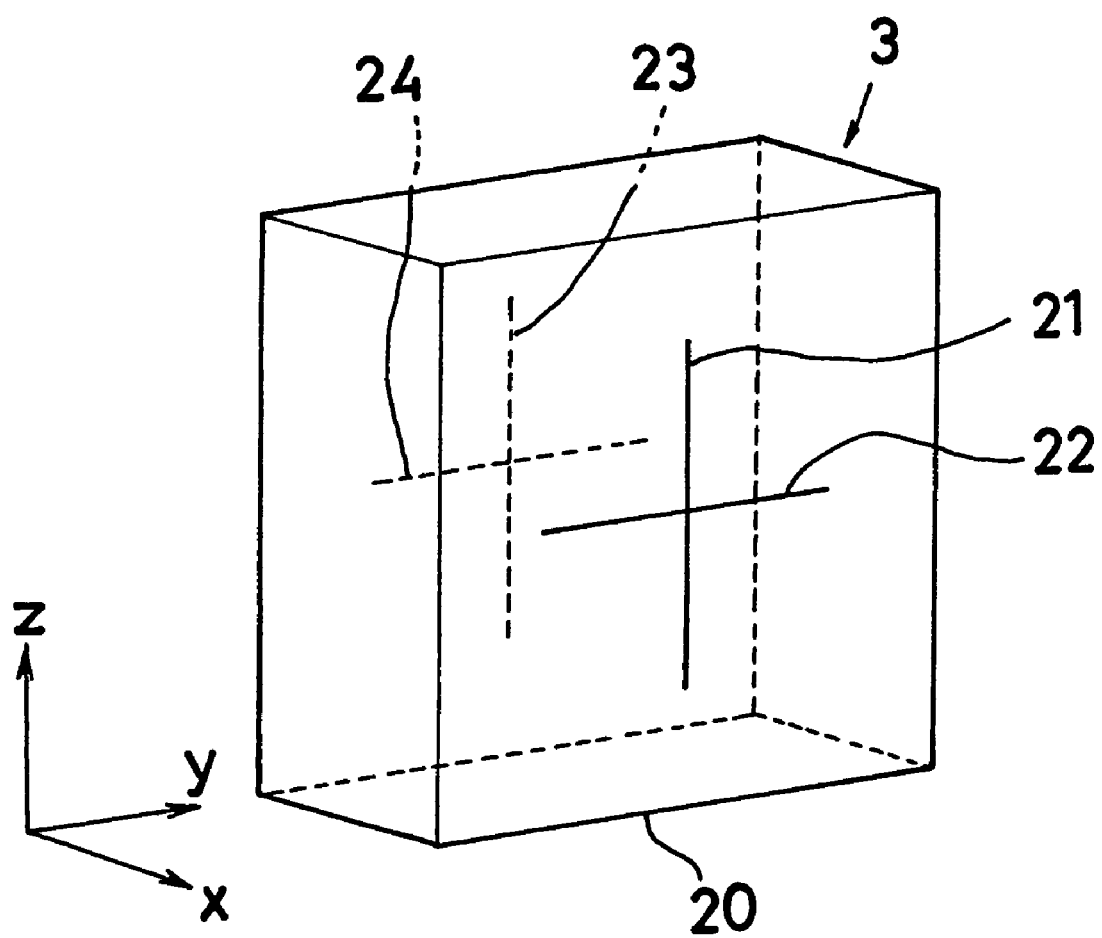
FIG. 6 is a fragmentary perspective view showing another example of the stress detecting sensor of the wheel-acting force measuring device according to the present invention.

To measure the side force as a wheel-acting force, a stress detecting sensor shown in FIG. 6 is used, wherein the strain gauges 21 through 24 are attached to extend in the direction of the y-axis or z-axis and the x-direction, y-direction and the z-direction coincide with the direction of travel 9 of the wheel, the direction 10 of the axle, and the vertical direction 11, respectively, and are connected in the same manner as in the signal processing circuit shown in FIG. 5. Thereby, a wheel-acting force measuring device can be constituted.

Figure 7:
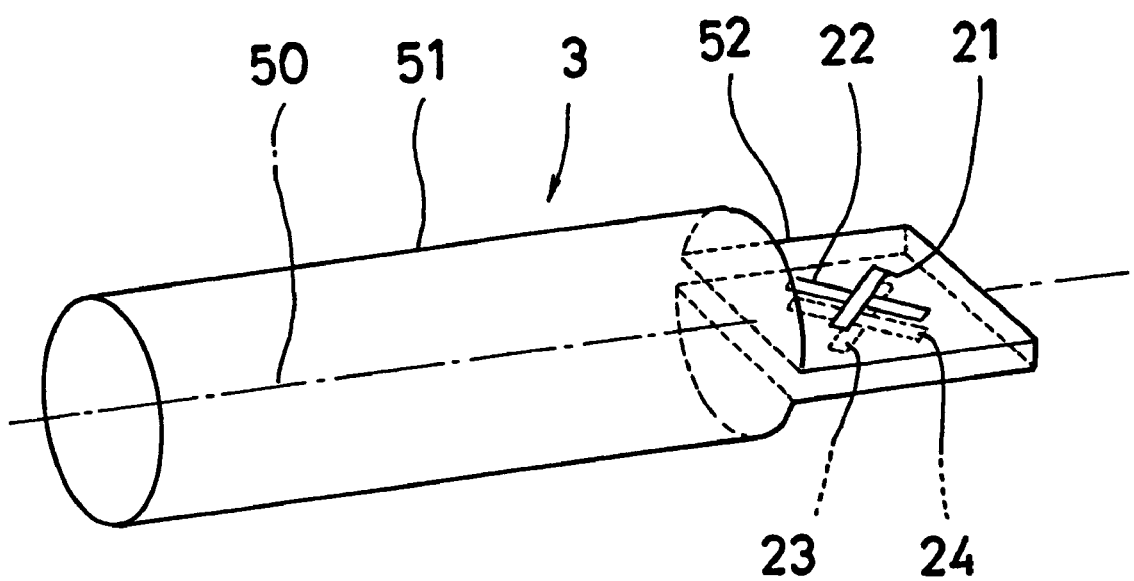
FIG. 7 is a fragmentary perspective view shoving another example of the stress detecting sensor of the wheel-acting force measuring device according to the present invention.
Figure 8:
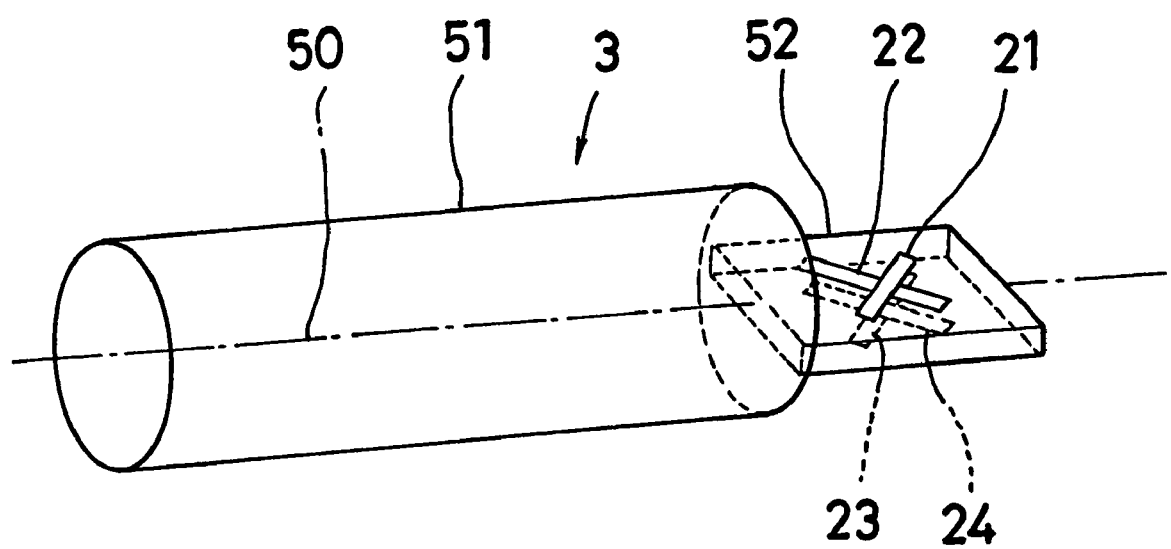
FIG. 8 is a fragmentary perspective view showing still another example of the stress detecting sensor of the wheel-acting force measuring device according to the present invention.

Other embodiments of stress detecting sensors are shown in FIGS. 7 and 8. In these embodiments, the stress detecting sensor comprises a bar-like structure 51, a flat plate 52 formed on one end surface of said structure 51 and measuring strain gauges 21 through 24 attached to said flat plate 52. In this case also, there is shown an example in which metal resistance wire strain gauges are attached as measuring gauges. The bar-like structure 51 may be of plastic material or the same material as that of the axle 1 in which the stress detecting sensor is embedded. The strain gauges 21, 22, 23 and 34 are attached to the flat plate 52 with the axis of each strain gauge forming an angle of 45 degrees with respect to the center axis 50 and the bar-like structure is fixedly attached in the hole 2 of said axle 1. That is, it is fixedly attached by hammering, bonding, soldering, welding or shrink fitting. The presence of the bar-like structure 51 provides a merit that in fixedly embedding the stress detecting sensor 3 in the hole 2, the position and direction of the strain gauges can be easily set as predetermined. Particularly, in the stress detecting sensor shown in FIG. 8, the width of the flat plate 52 is smaller than the diameter of the bar-like structure 51. As a result, there is a merit that in fixedly embedding the stress detecting sensor 3 in the hole 2, the flat plate 52 is prevented from being subjected to deformation, such as torsional deformation, caused as by rotation, which would produce irrelevant strain or damage of the flat plate 52.

Figure 9:
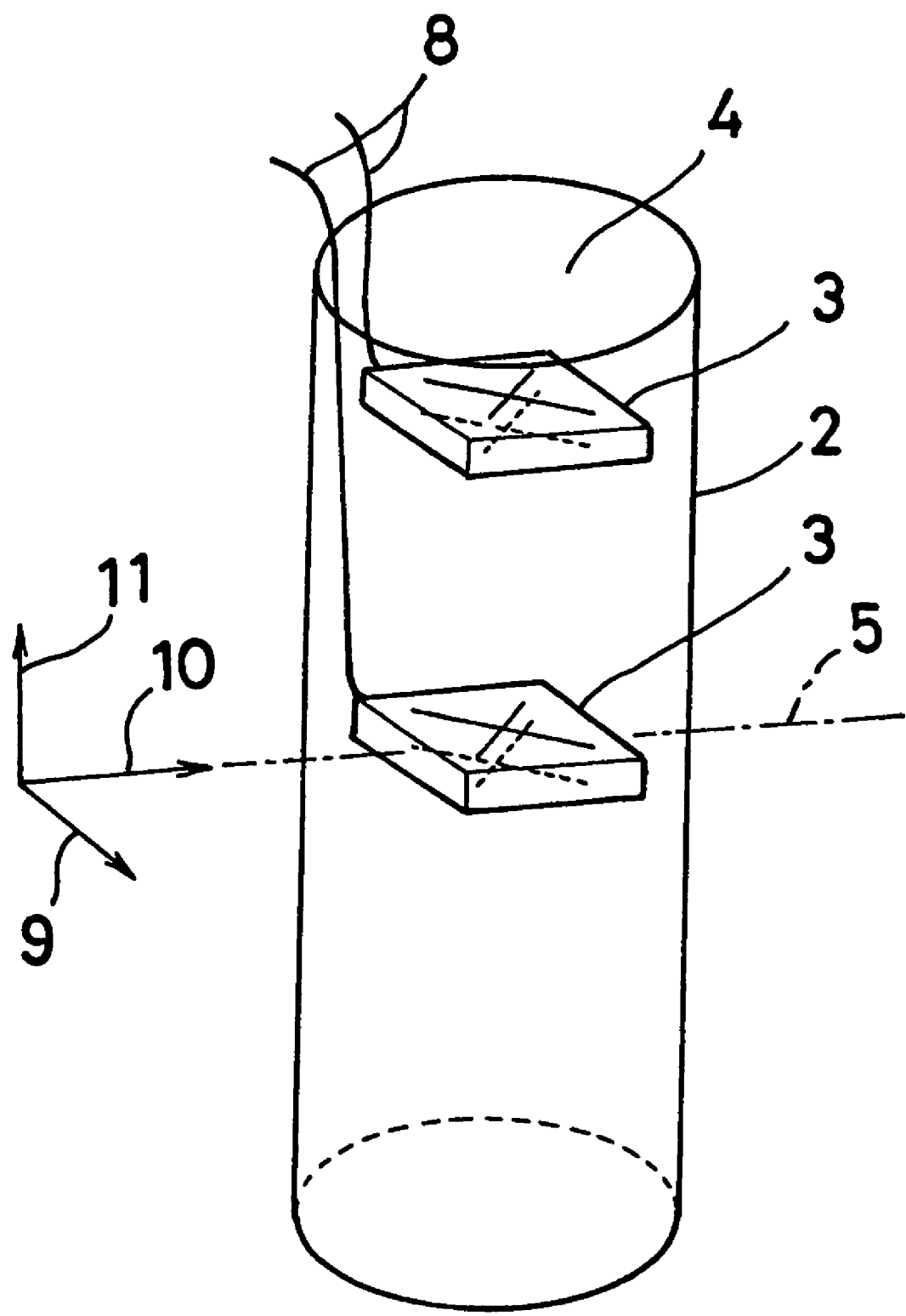
FIG. 9 is a perspective view showing an example of a device for measuring a road surface friction force and a brake torque or driving torque as wheel-acting forces, said device using a plurality of stress detecting sensors.

FIG. 9 is an enlarged view showing the hole 2 vertically formed in the axle. In this example, two stress sensors shown in FIG. 4 are used. The are placed so that the x-, y- and z-directions respectively coincide with the the vertical direction 11, the direction of travel 9 of the wheel, and the direction 10 of the axle. By connecting the sets of strain gauges 21 through 24 and 31 through 34 in the same manner as in the signal processing circuit shown in FIG. 3, it is possible to deliver signals indicating the road surface friction force and driving torque or the brake torque which is produced oh actuation of the braking device. If the sum of outputs from the two amplifying circuits 41, 44 Is calculated, the road surface friction force is obtained and if the difference therebetween is calculated, said torque is obtained. In this example, one stress detecting sensor 3 is placed on the center axis 5 of the axle, but the same effect can be obtained even if both are placed off the center axis 5.

Figure 10:
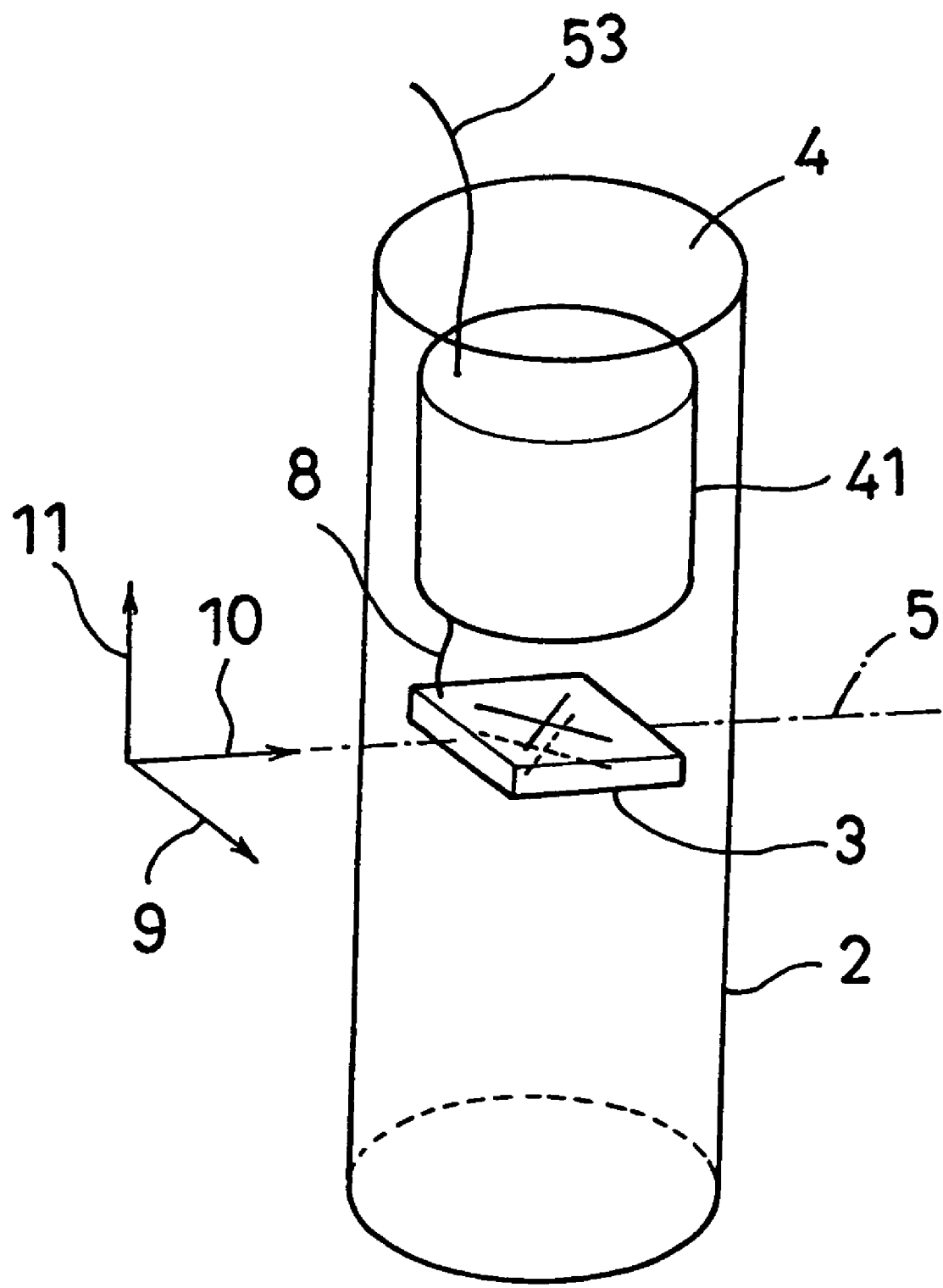
FIG. 10 is a perspective view showing an example of a device for measuring a road surface friction force as a wheel-acting force, wherein a signal processing circuit and a stress detecting sensor are embedded in the same hole.

FIG. 10 shows an example of measuring the road surface friction force, wherein the axle is formed with a vertical hole and the amplifying circuit 41 is embedded in the hole 2 together with the stress detecting sensor 3. Embedding the amplifying circuit 41 in the hole 2 is made possible by using the present day circuit integration technology. By placing the amplifying circuit 41 adjacent the stress detecting sensor 3, it is possible to provide on a signal wire 53 an output signal which has less noise.

Figure 11:
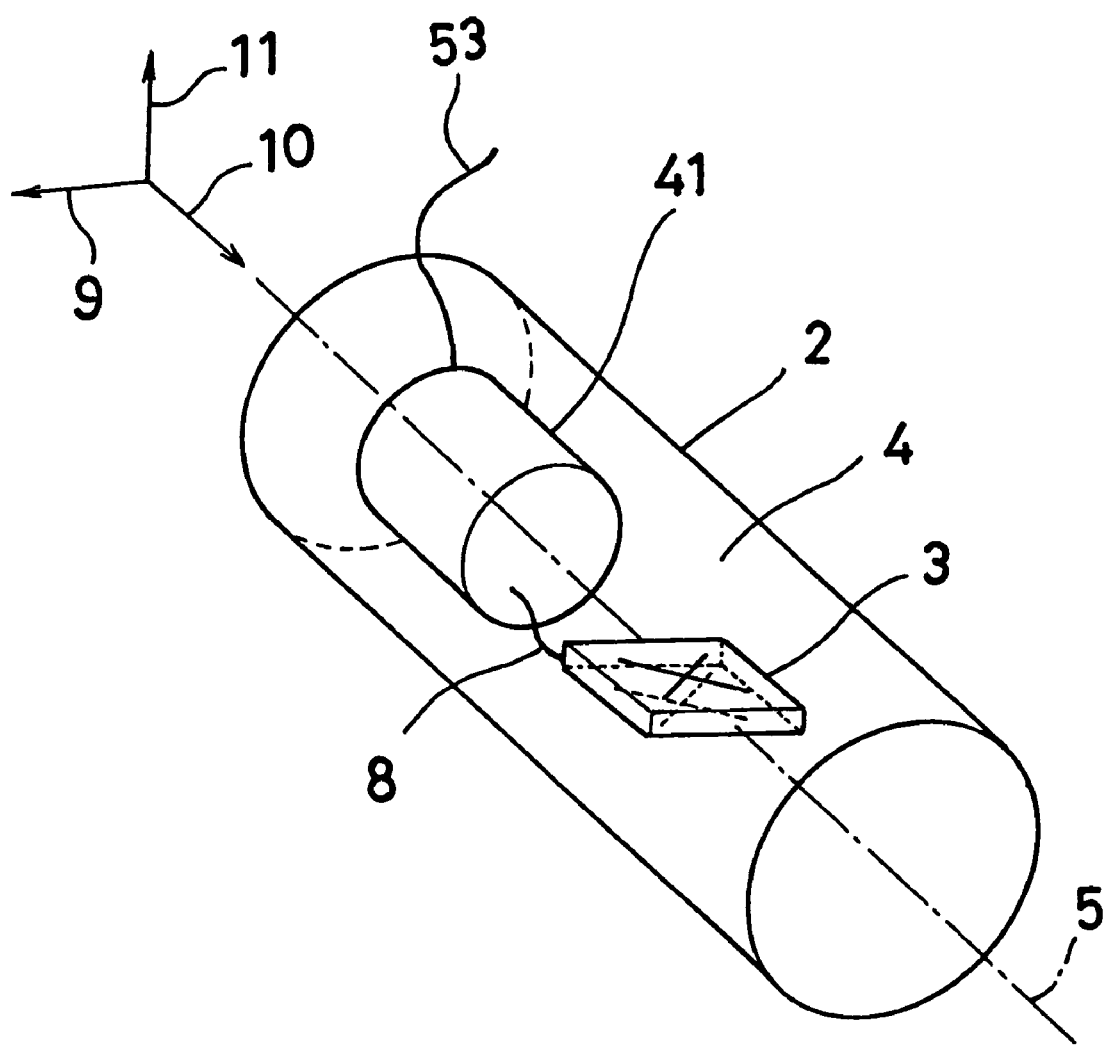
FIG. 11 is a perspective view showing an example of a device for measuring a road surface friction force as a wheel-acting force, wherein a signal processing circuit and a stress detecting sensor are embedded in the same hole, said example showing the use of a horizontal hole.

FIG. 11 shows an example in which the axle is formed with a horizontal hole in which the amplifying circuit 41 together with the stress detecting sensor 3 is embedded as in FIG. 10 an as to measure the road surface friction force.

Figure 12:
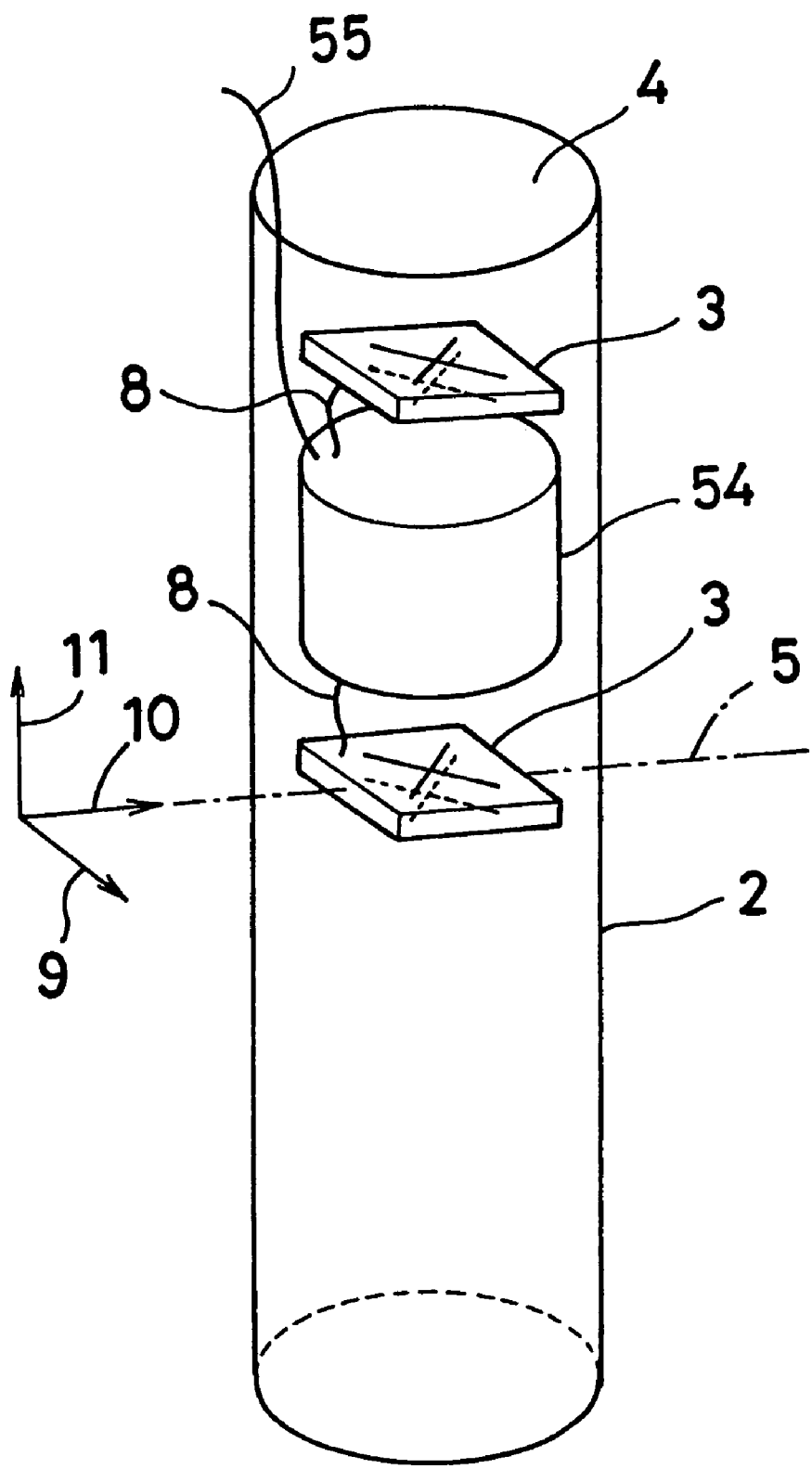
FIG. 12 is a perspective view shoving an example of a device for measuring a road surface friction force and a brake torque or driving torque as wheel-acting forces, wherein a plurality of stress detecting sensors are used and a signal processing circuit and a stress detecting sensor are embedded in the same hole.

FIG. 12 shows an example of a device using two stress detecting sensors for measuring the road surface friction force and the driving torque or brake torque acting on the wheel, wherein a signal processing circuit 54 comprising amplifying circuits 41 and 44 and an arithmetic circuit 47 is embedded in the hole together with the stress detecting sensor 3. The numeral 55 denotes an output signal wire for the signal processing circuit 54. In addition, if semiconductor strain gauges are used, the amplifying circuit and arithmetic circuit can be integrally embedded in the hole.

Figure 13:
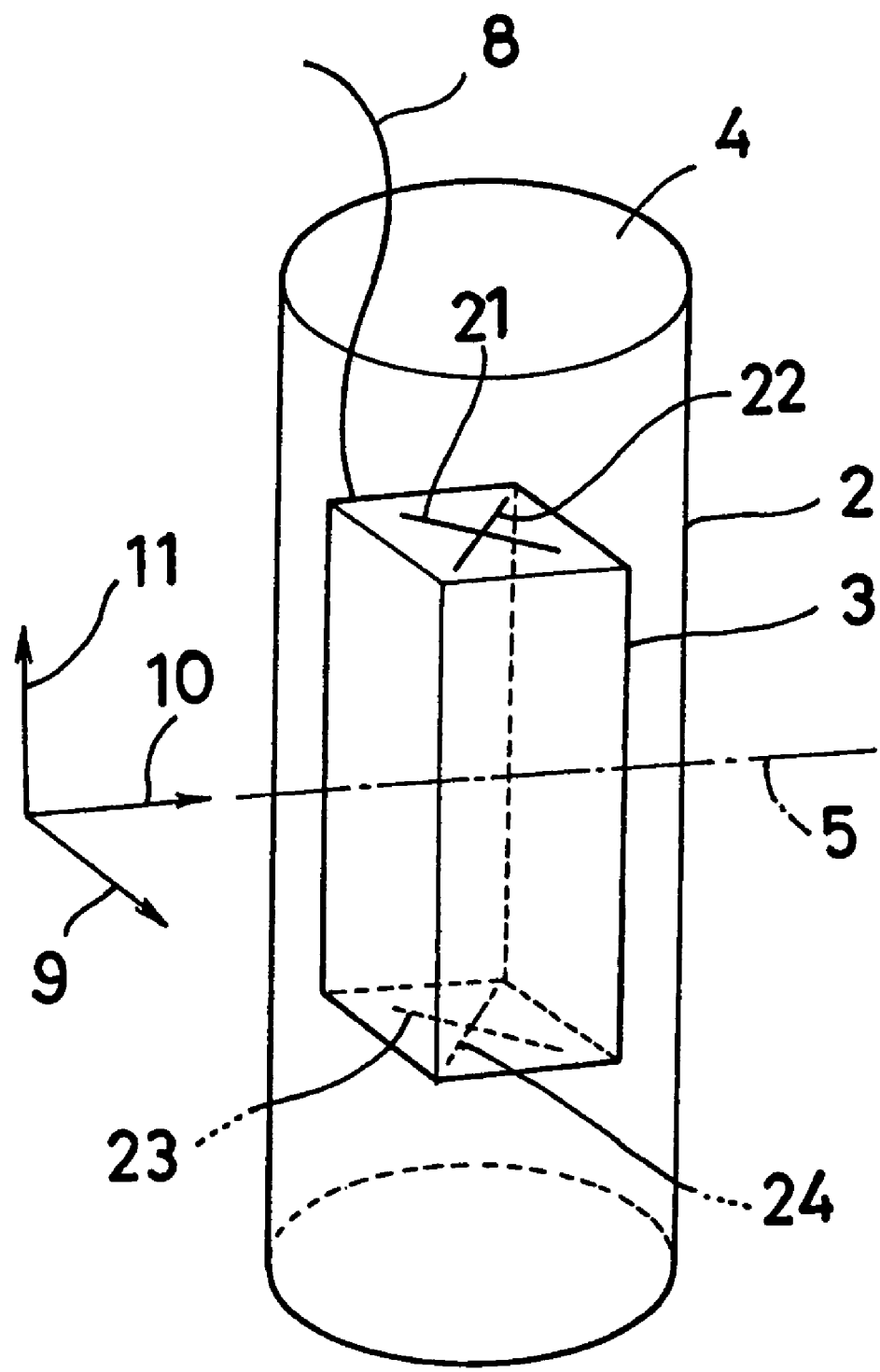
FIG. 13 is a perspective view showing another example of the stress detecting sensor of a device for measuring a brake torque or driving torque as a wheel-acting force.

FIG. 13 shows an example of using a single stress detecting sensor 3 to measure the brake torque or driving torque. If the strain gauges are connected in the order 21, 23, 22, 24 with 22 and 23 interchanging their positions as shown, the device for measuring said torque can be constructed.

Figure 14:
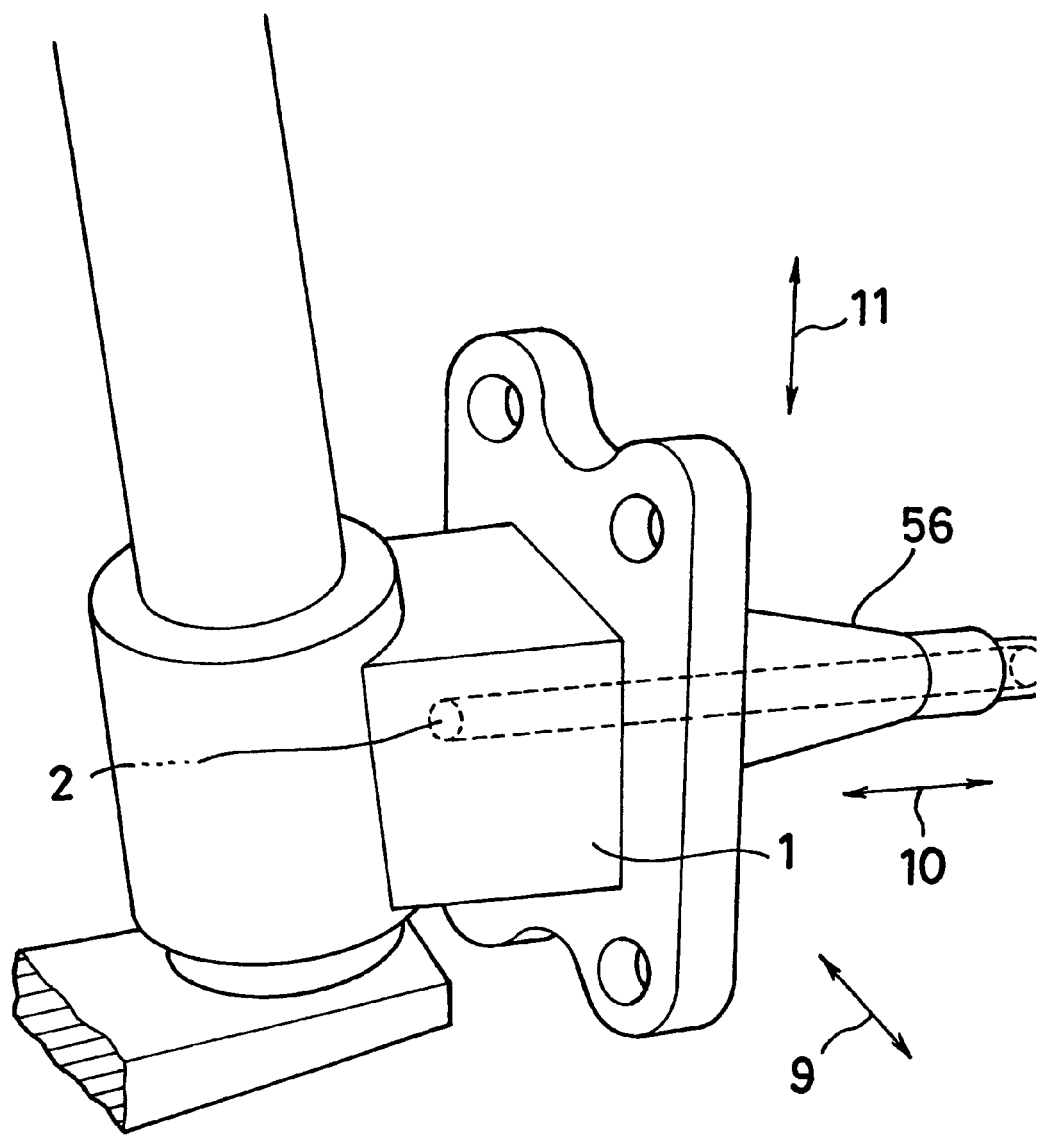
FIG. 14 is a fragmentary perspective view showing an example of another embodiment of a hole in which the stress detecting sensor of a wheel-acting force measuring device is fixedly embedded.

FIG. 14 shows an example in which a hole 2 is formed to extend in the axle direction 10. The position of the hole is not limited to the knuckle position in the example shown in FIG. 1; for example, it may be formed in a portion beyond the same further to the front end portion, or the so-called spindle 56. The embodiment shown in FIG. 14 has a merit that while using stress detecting sensors of the same type as In FIG. 7 or 8, the same device con be used as a road surface friction force detecting device or a normal counterforce detecting device simply by changing the directions of such sensors.

Figure 15:
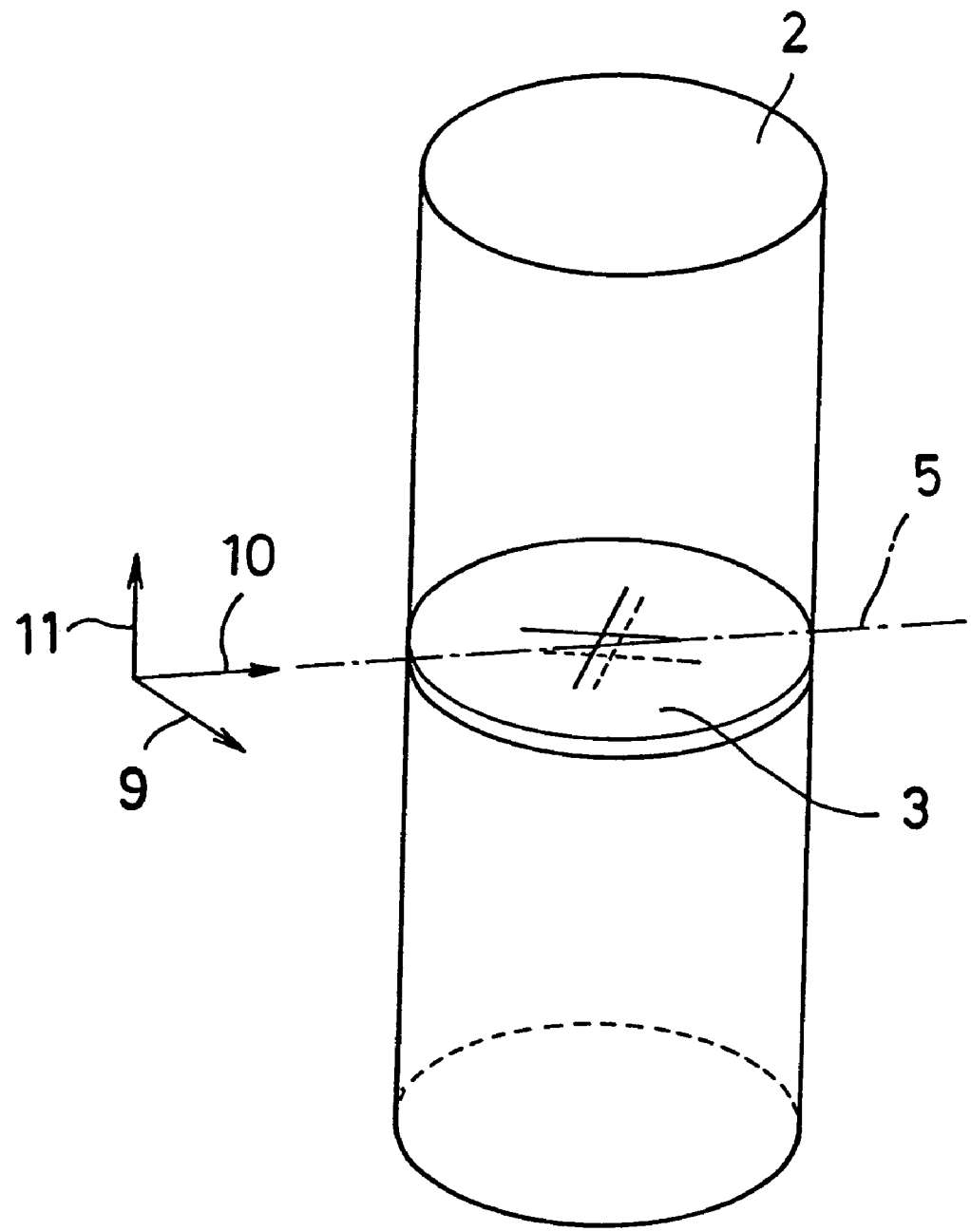
FIG. 15 is a perspective view showing another embodiment of a stress detecting sensor being fixedly embedded in a hole.
Figure 16:
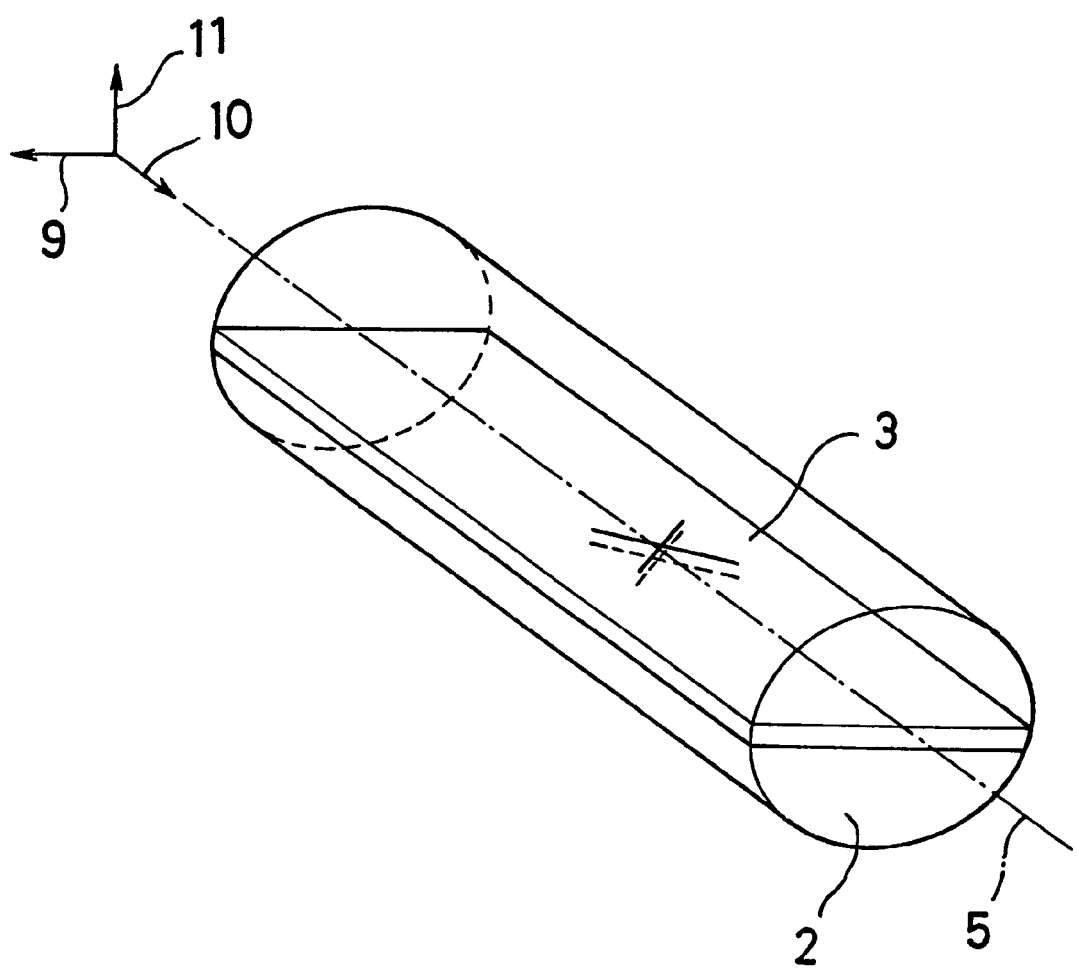
FIG. 16 is a perspective view shoving still another embodiment of a stress detecting sensor being embedded in a hole.

In addition, FIGS. 1 and 9 through 13 have shown embodiments in which the stress detecting sensor 3 is fixedly embedded in the hole 2 using the filler 4 (spacing agent), the invention is not limited thereto; for example, as shown in FIG. 15, a stress detecting sensor 3 with strain gauges attached to the front surface, back surface or front and back surfaces or Interior of a disk-like base block of plastic material, metal base or semiconductor base, such as silicone, having a diameter approximately equal to the inner diameter of the hole 2 is fixedly embedded in the hole 2 through a sealing agent or adhesive agent or directly, whereby the peripheral surface of the disk-like base block and the inner peripheral wall of the hole, which contact each ether, are fixed together.

Figure 17:
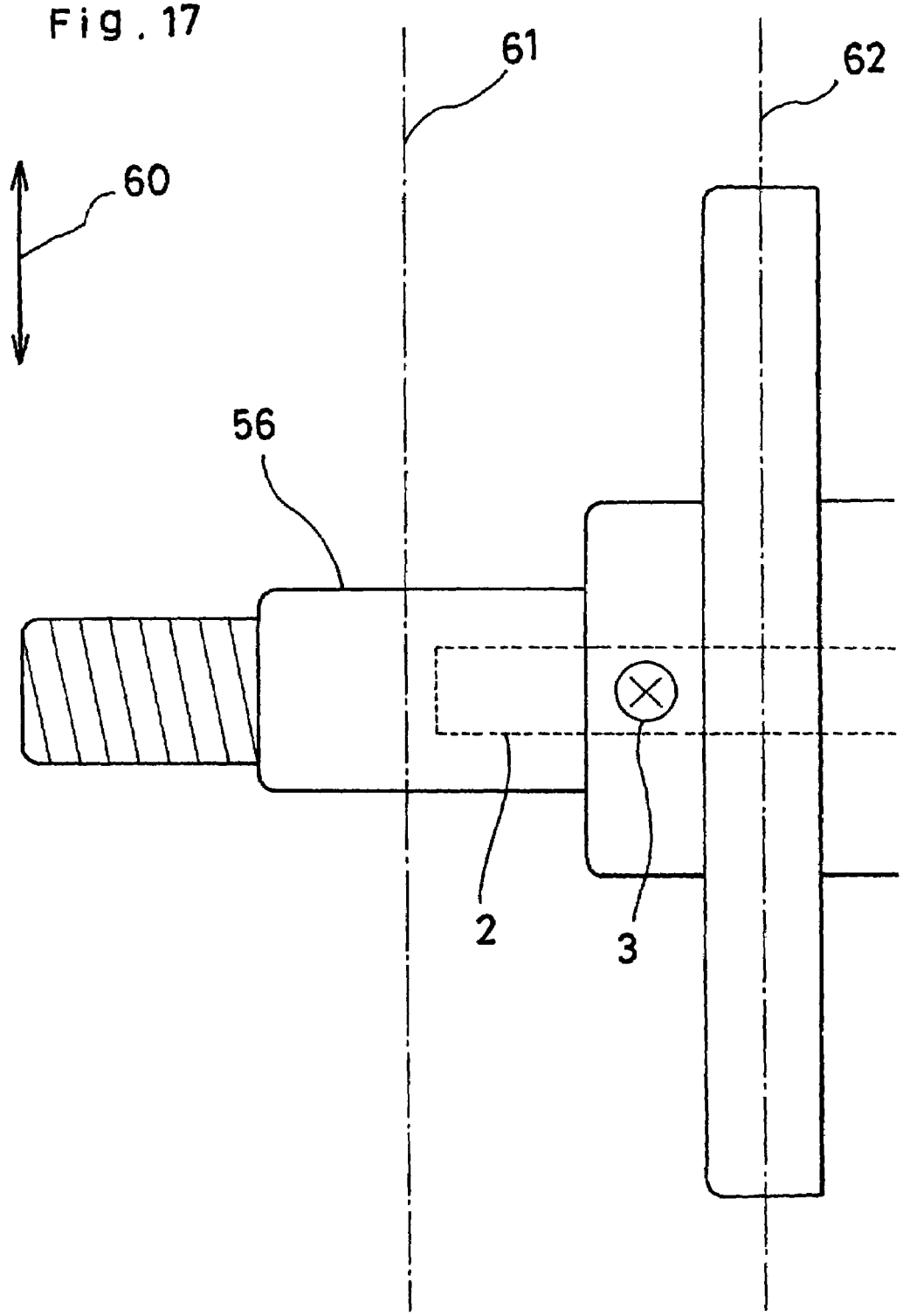
FIG. 17 is a view shoving an embodiment of embodiment of a stress detecting sensor described in claim 3.

Further, as shown in FIG. 15, a stress detecting sensor 3 having strain gauges attached to the front and/or back or interior of a planar substrate in the form of a semiconductor base of plastic material, metal base or silicone may be embedded in a hole in such a manner that their contact surfaces, or the lateral peripheral surface of the planar substrate and the inner peripheral wall are fixed together through the Intermediary of a sealant or adhesive agent or directly by force-fitting FIG. 17 shows an example of the embedment of a stress detecting sensor in claim 3. This figure is a plan view of the spindle 56 of an axle of a vehicle. At any position which is located inwardly of a position 61 located most inwardly (vehicle body side) of the area of contact between the wheel and the road, the friction force between the Wheel and the road surface and the normal counterforce, acting on the wheel, can be measured. Further, at a position located outwardly (wheel side) of the brake disk attaching position, most of the force due to the torsional deformation during application of the brake is transmitted to the inner side (vehicle body side), never measured. Therefore, the stress detecting sensor 3 embedded in a placed between the inside (vehicle body side) of the position 61 of the hole 2 and the outside (wheel side) of the position 62 is free from cross talk caused by shearing strain due to torsional deformation during application of the brake.

Figure 18:
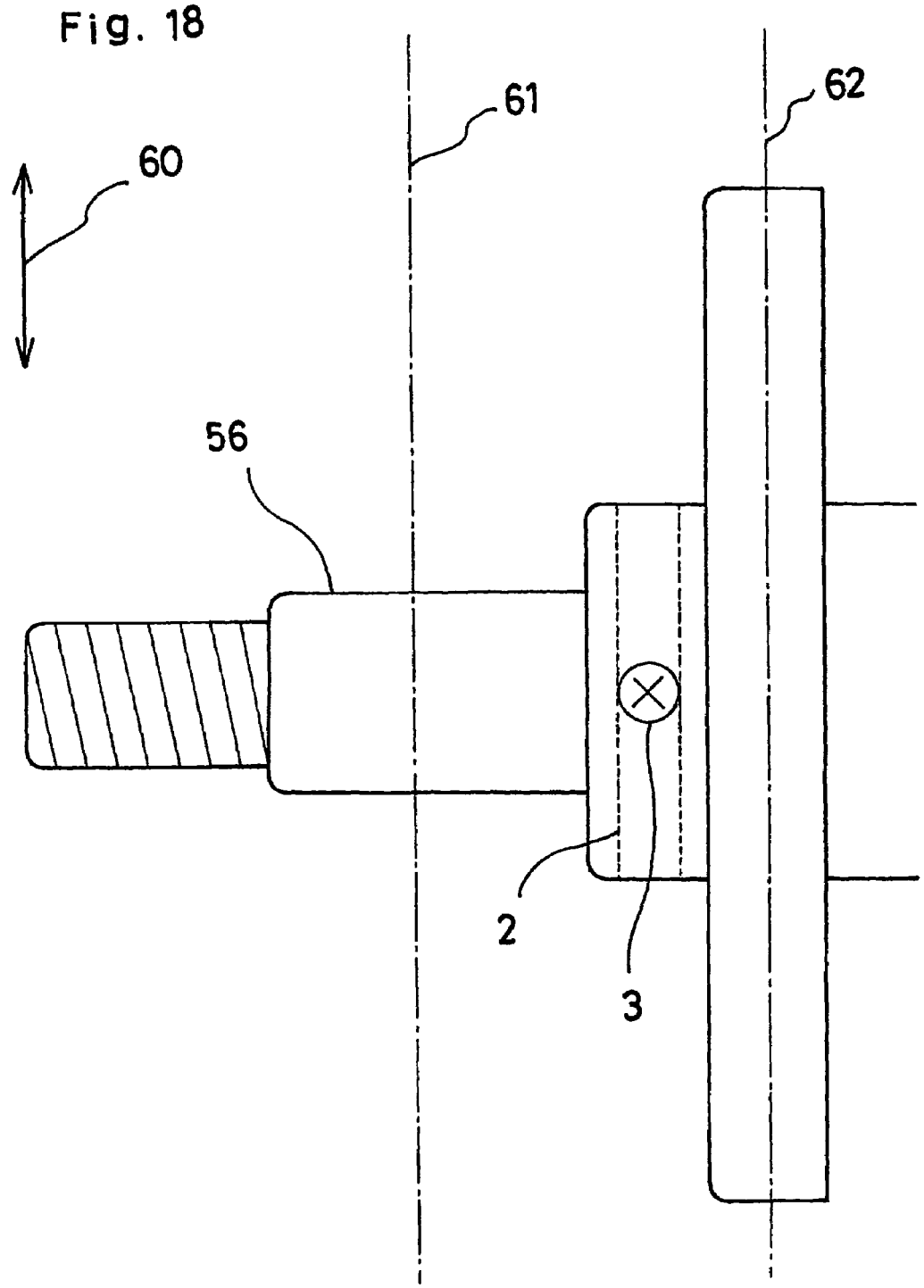
FIG. 18 is a view shoving an example in which the stress detecting sensor is embedded with the position of the hole changed.

Let an arrow 60 be the direction of travel of the vehicle, and the stress detecting sensor 3 serves as a road surface friction force detecting sensor. Further, if the arrow 60 indicates the vertical direction, then the stress detecting sensor 3, as shown In FIG. 18, serves as a sensor for detecting the normal counterforce acting on the axle. Further, as shown in FIG. 19, if two stress detecting sensors 3 are simultaneously embedded in a hole 2 in such a manner as to satisfy said two directions, then it serves as a road surface friction coefficient detecting sensor, capable of detecting the road surface friction force and the normal counterforce at the same time.

Further, in the embodiment shown in FIG. 17, the hole 2 has been formed from the vehicle body side; however, it is only necessary that the sensor be embedded between the positions 61 and 62; for example, it may be formed from the front end of the axle opposite to the hole 2 or it may be formed throughout the axle. Further, the same merits as in this embodiment can also be obtained even if such hole, as shown in FIGS. 18 and 19 is formed between the positions 61 and 62 and In a direction normal to the hole 2 of FIG. 17.

In addition, in the above embodiments, the stress detecting sensor has been shown embedded in the stress center axis of or adjacent the axle; however, the invention is not limited thereto, and a stress detecting sensor way be disposed at the stress center point (neutral spot) around an axle such as in or adjacent an axle.

ADVANTAGES OF THE INVENTION

According to the present invention, cross talk to the stress detecting sensor caused by the brake torque can be effectively eliminated, so that wheel-acting forces, such as the road surface friction force, normal counterforce, road surface friction coefficient, side force, brake torque and driving torque which act on the wheels of a vehicle can be measured with ease. If the invention is applied to an antilock brake system, it is possible to minimize the braking distance irrespective of road surface conditions while achieving the object of antilocking. Furthermore, there is no need to provide a complicated device for measuring the vehicle velocity. In the case of a traction control system, it is possible to minimize the accelerating distance irrespective of road surface conditions. Thus, the invention is highly effective as it greatly improves the performance of antilock brake systems and traction control systems.

What is claimed is:

1. A wheel-acting force measuring system for measuring generated by a wheel having a road contacting surface, the system comprising:
   an axle having a brake disk attachment portion and a spindle portion extending outwardly from said brake disk attachment portion to which said wheel is mounted; and
   a stress detecting sensor disposed in a hole in said spindle portion at a position between said brake disc attachment portion and a plane perpendicular to said road contacting surface of said wheel, wherein a peripheral surface of said stress detecting sensor and an inner peripheral wall of said hole contact each other to fix the stress detecting sensor in position.

2. The system of claim 1, further comprising:
   a brake caliper having a brake caliper angle defined by a caliper fixing axis and a wheel traveling direction; and
   said stress detecting sensor being mounted substantially at said brake caliper angle with respect to said wheel traveling direction and parallel to said caliper fixing axis.

3. The system of claim 1, wherein said stress detecting sensor is located on a stress center axis of said axle.

4. The system of claim 3, further comprising a signal processing circuit disposed together with said stress detecting sensor for processing signals from said stress detecting sensor.

5. The system of claim 4, wherein said stress detecting sensor includes a strain gauge disposed at an angle of approximately 45 degrees with respect to said stress center axis of said axle.

6. The system of claim 3, wherein said stress detecting sensor includes a strain gauge disposed at an angle of approximately 45 degrees with respect to said stress center axis of said axle.

7. The system of claim 1, further comprising a signal processing circuit disposed together with said stress detecting sensor for processing signals from said stress detecting sensor.

8. The system of claim 1, wherein said stress detecting sensor includes a strain gauge disposed at an angle of approximately 45 degrees with respect to a stress center axis of said axle.

9. The system of claim 2, wherein said stress detecting sensor is located on a stress center axis of said axle.

10. The system of claim 9, further comprising a signal processing circuit disposed together with said stress detecting sensor for processing signals from said stress detecting sensor.

11. The system of claim 10, wherein said stress detecting sensor includes a strain gauge disposed at an angle of approximately 45 degrees with respect to said stress center axis of said axle.

12. The system of claim 9, wherein said stress detecting sensor includes a strain gauge disposed at an angle of approximately 45 degrees with respect to said stress center axis of said axle.

13. The system of claim 2, further comprising a signal processing circuit disposed together with said stress detecting sensor for processing signals from said stress detecting sensor.

14. The system of claim 2, wherein said stress detecting sensor includes a strain gauge disposed at an angle of approximately 45 degrees with respect to a stress center axis of said axle.

* * * * *